United States Patent
Jafari

(10) Patent No.: US 8,791,377 B2
(45) Date of Patent: Jul. 29, 2014

(54) SPRING LOCK ELECTRICAL FITTING

(75) Inventor: Afshin Jafari, Los Angeles, CA (US)

(73) Assignee: Keemaya LLC, Lawndale, CA (US)

( * ) Notice: Subject to any disclaimer, the term of this patent is extended or adjusted under 35 U.S.C. 154(b) by 242 days.

(21) Appl. No.: 13/190,116

(22) Filed: Jul. 25, 2011

(65) Prior Publication Data

US 2012/0024597 A1 Feb. 2, 2012

Related U.S. Application Data

(60) Provisional application No. 61/367,882, filed on Jul. 27, 2010.

(51) Int. Cl.
*H02G 3/18* (2006.01)

(52) U.S. Cl.
USPC .............. 174/665; 174/660; 174/668

(58) Field of Classification Search
USPC ........... 174/50.52, 50.53, 50.55, 53–59, 68.1, 174/68.3, 69, 70 R, 84 R, 135, 650, 651, 174/656, 657, 659–666, 668, 669; 439/544–546, 552, 557, 548–556, 559, 439/574, 575
See application file for complete search history.

(56) References Cited

U.S. PATENT DOCUMENTS

| | | | | |
|---|---|---|---|---|
| 5,373,106 A * | 12/1994 | O'Neil et al. | ................. | 174/669 |
| 6,034,326 A | 3/2000 | Jorgensen | | |
| 6,114,630 A * | 9/2000 | Gretz | ............................. | 174/660 |
| 6,335,488 B1 | 1/2002 | Gretz | | |
| 6,355,884 B1 | 3/2002 | Gretz | | |
| 6,444,907 B1 * | 9/2002 | Kiely | ............................. | 174/657 |
| 6,596,939 B1 | 7/2003 | Gretz | | |
| 6,670,553 B1 | 12/2003 | Gretz | | |
| 6,682,355 B1 | 1/2004 | Gretz | | |
| 6,709,280 B1 | 3/2004 | Gretz | | |
| 6,780,029 B1 | 8/2004 | Gretz | | |
| 6,827,604 B1 * | 12/2004 | White | ........................... | 439/557 |
| 6,849,803 B1 * | 2/2005 | Gretz | ............................ | 174/665 |
| 6,932,390 B1 | 8/2005 | Gretz | | |
| 7,148,431 B2 * | 12/2006 | Pyron | ............................ | 174/656 |
| 7,161,095 B1 | 1/2007 | Gretz | | |
| 7,358,448 B2 * | 4/2008 | Auray et al. | ................... | 174/666 |
| 7,381,088 B1 * | 6/2008 | Gretz | ............................. | 439/557 |
| 7,390,979 B1 | 6/2008 | Johnson | | |
| 7,476,817 B1 * | 1/2009 | Shemtov | ....................... | 174/661 |
| 7,485,806 B1 * | 2/2009 | Gretz | ............................... | 174/59 |
| 7,495,170 B2 | 2/2009 | Dinh et al. | | |
| 7,554,041 B2 * | 6/2009 | Ducret | ........................... | 174/655 |
| 8,350,163 B2 * | 1/2013 | Auray et al. | ................... | 174/650 |
| 2010/0084854 A1 * | 4/2010 | Sathyanarayana et al. | ..... | 285/84 |

OTHER PUBLICATIONS

PCT/US2012/048153, International Search Report and Written Opinion dated Jan. 29, 2013.
Arlington flyer copyrighted 2007-2009; Snap2It Connectors.

* cited by examiner

*Primary Examiner* — Hoa C Nguyen
*Assistant Examiner* — Amol Patel
(74) *Attorney, Agent, or Firm* — Jeffrey G. Sheldon; Sheldon Mak & Anderson

(57) ABSTRACT

A fitting that anchors electrical wiring to a junction box or electrical panel includes gripping members which can releasably hold electrical wiring, in or out of armored conduit, and interference members which allow the fitting to be inserted through knock out apertures and, when in place, extend to prevent withdrawal from the aperture. Optionally a rotatable collar actuates the mechanisms and abuts the wall of the box or panel, eliminating any lateral movement when the interference members are engaged.

26 Claims, 15 Drawing Sheets

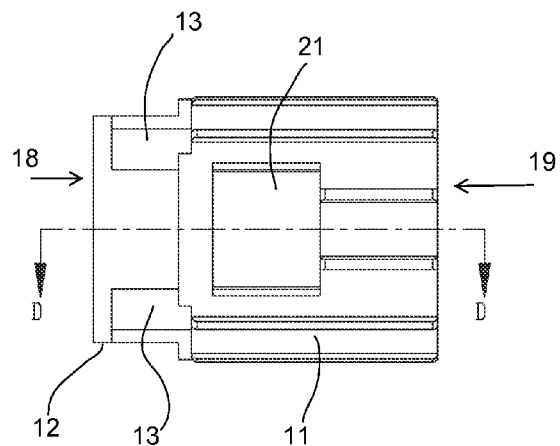
FIG. 3 A
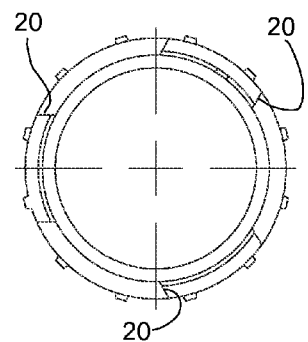
FIG. 3 B
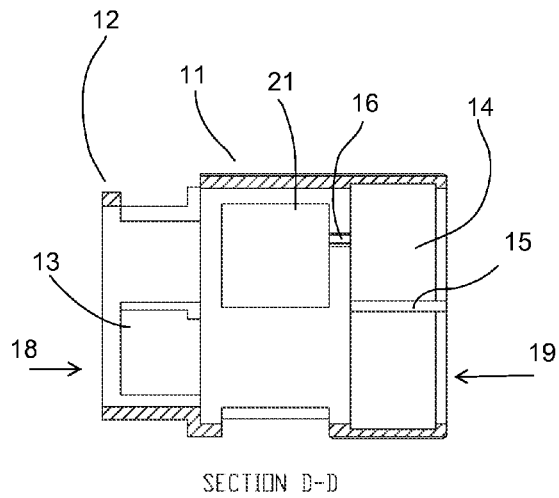
FIG. 3 C
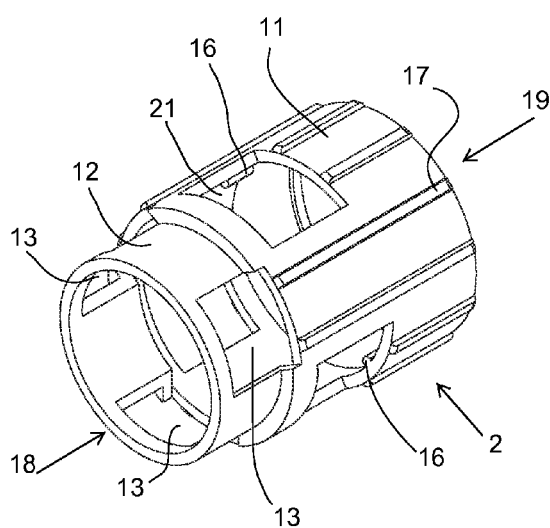
FIG. 3 D
FIG. 3

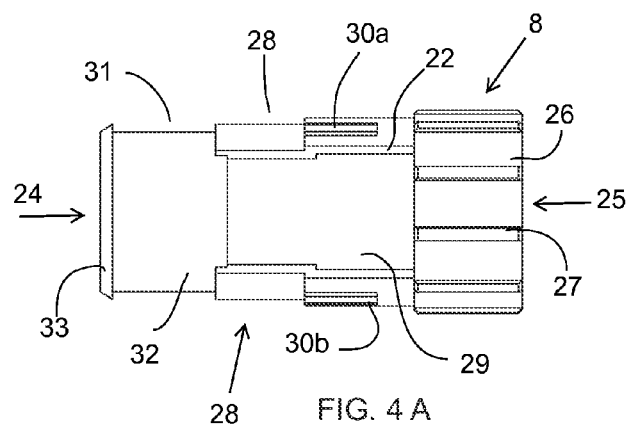
FIG. 4 A
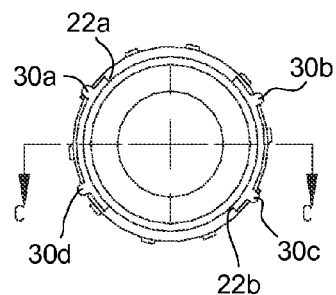
FIG. 4 B
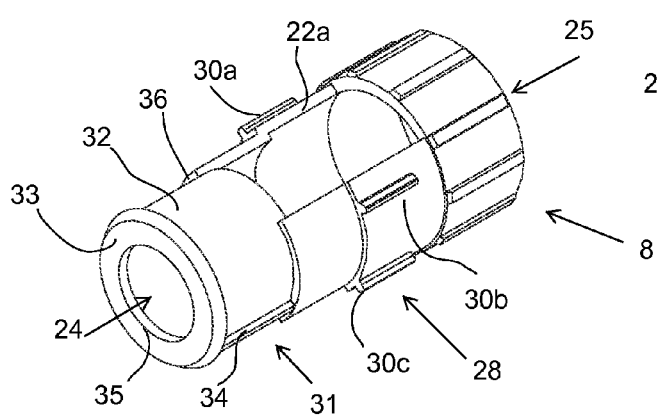
FIG. 4 D
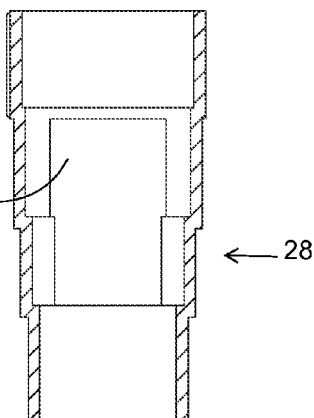
FIG. 4 C
FIG. 4

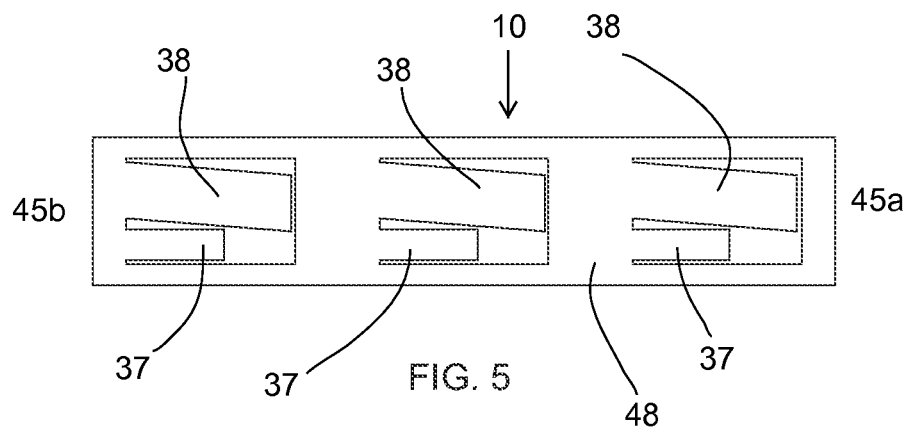
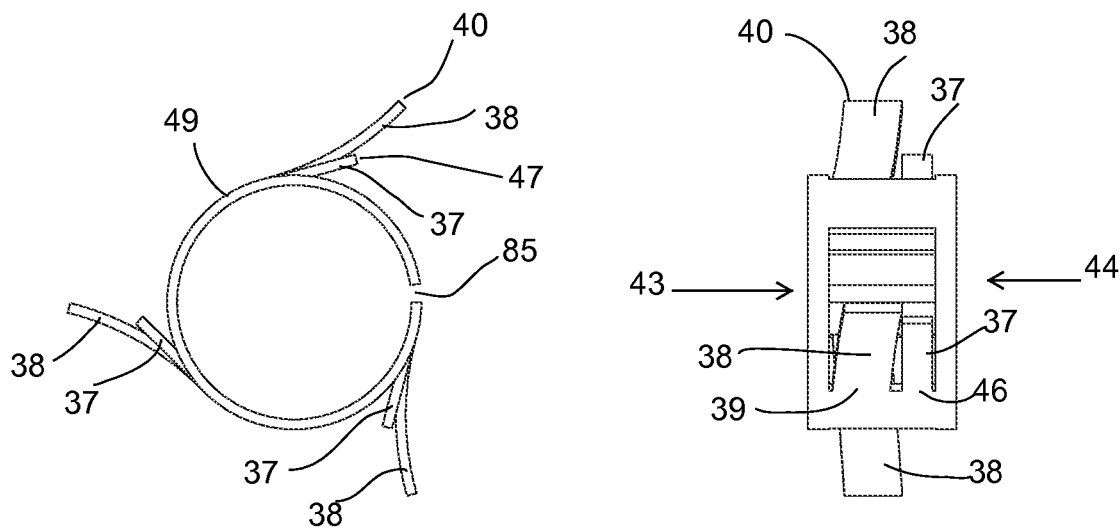
FIG. 6A
FIG. 6B
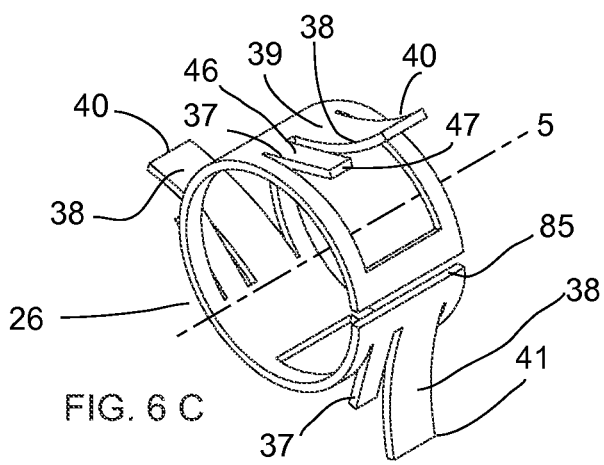
FIG. 6C
FIG. 6

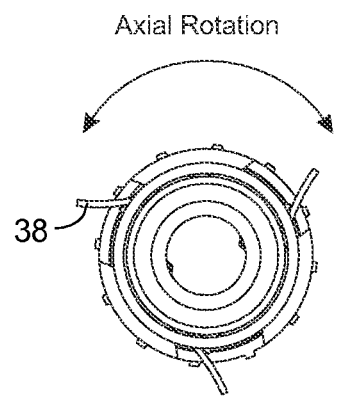
FIG. 7 A
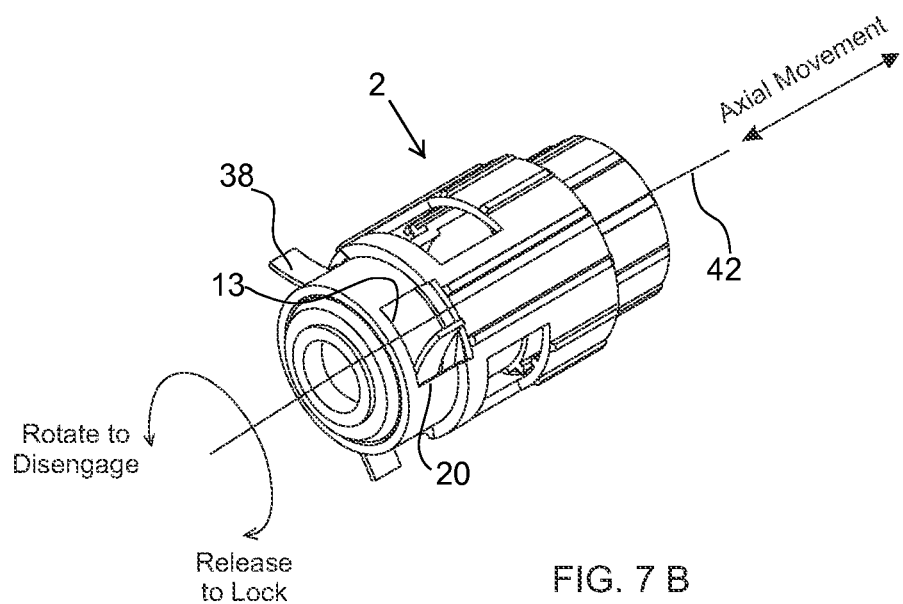
FIG. 7 B
FIG. 7

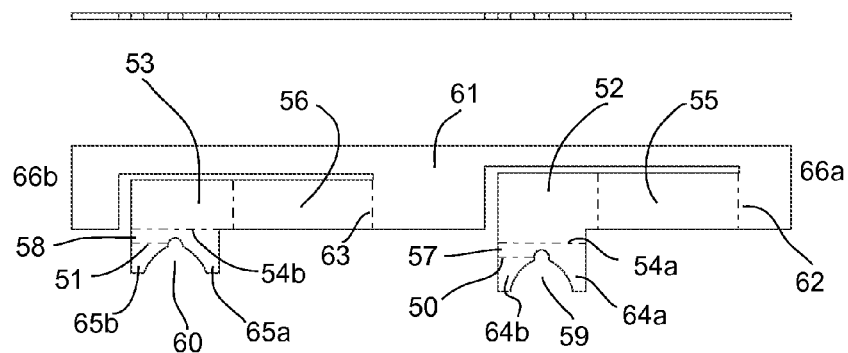
FIG. 8
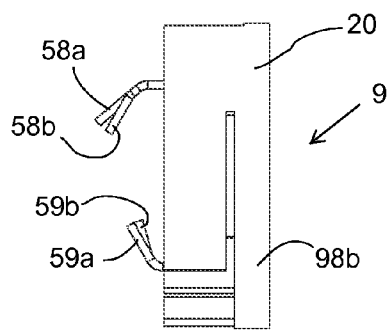
FIG. 9 A
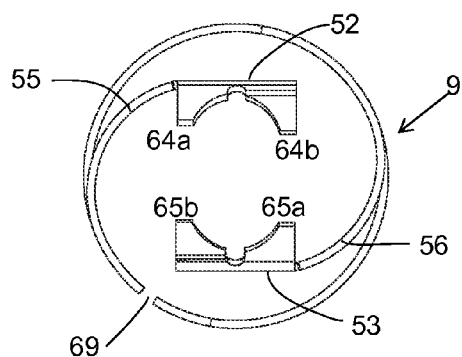
FIG. 9 B
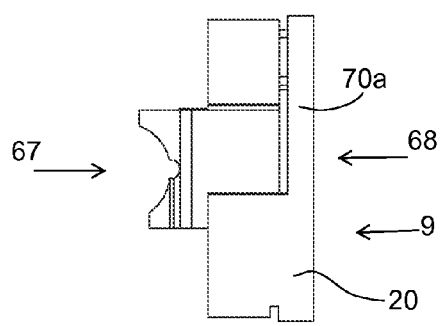
FIG. 9 C
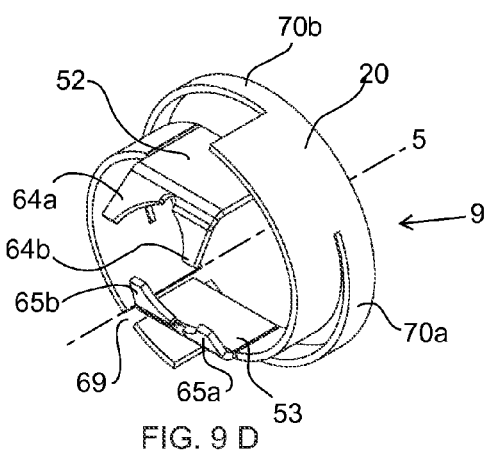
FIG. 9 D
FIG. 9

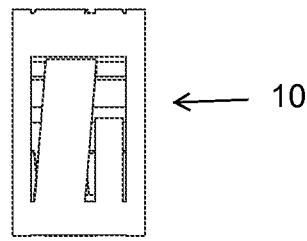
FIG. 10 A
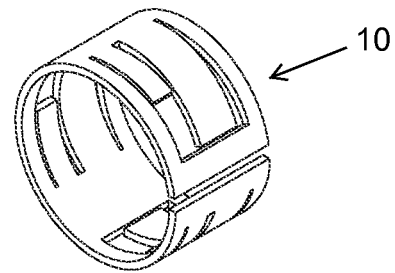
FIG. 10 B
FIG. 10
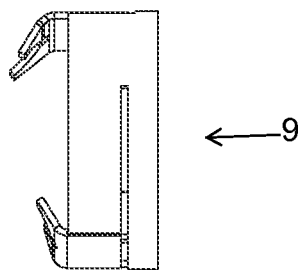
FIG. 11 A
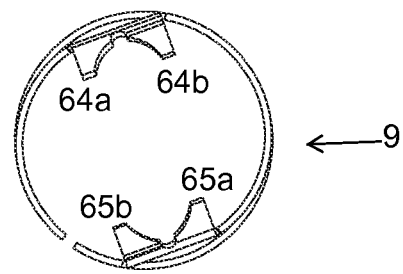
FIG. 11 B
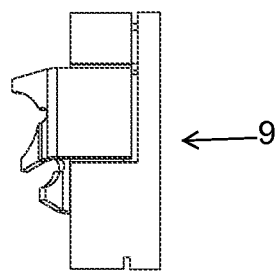
FIG. 11 C
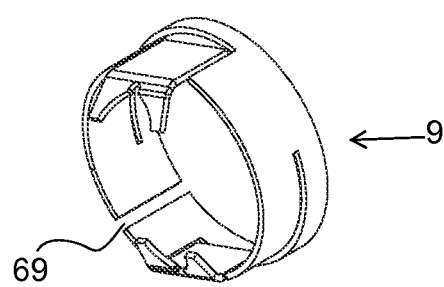
FIG. 11 D
FIG. 11

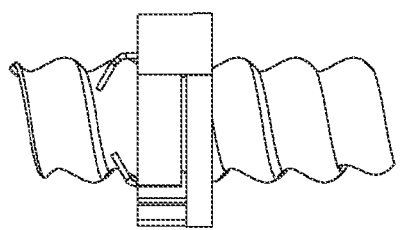
FIG. 12 A
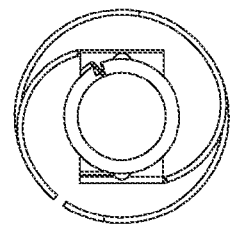
FIG. 12 B
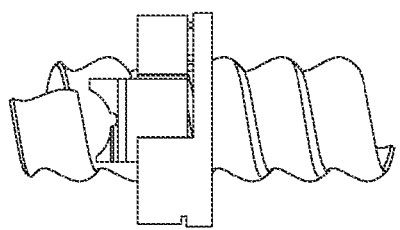
FIG. 12 C
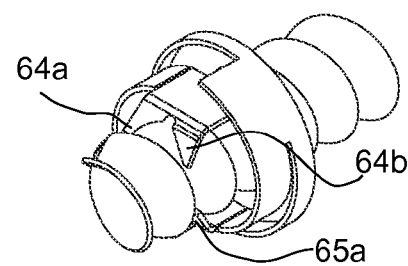
FIG. 12 D
FIG. 12
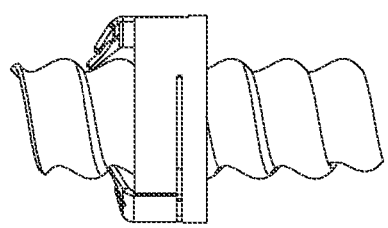
FIG. 13 A
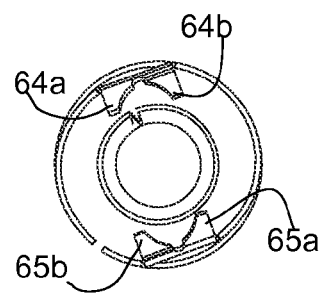
FIG. 13 B
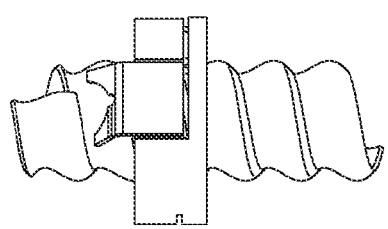
FIG. 13 C
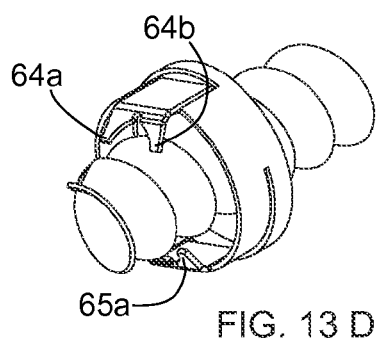
FIG. 13 D
FIG. 13

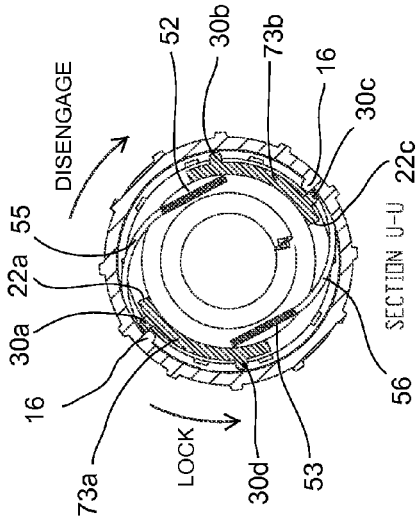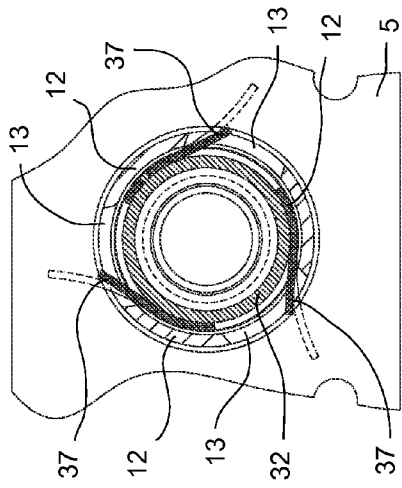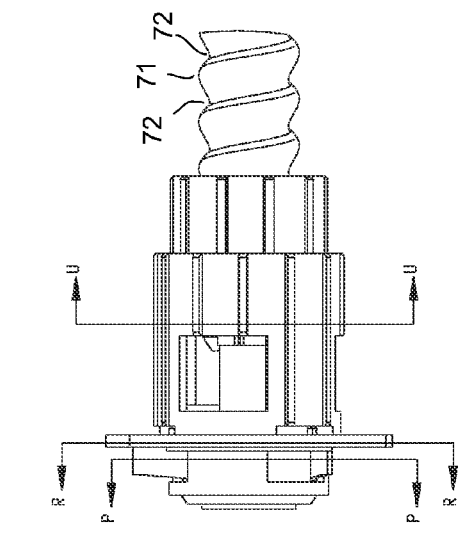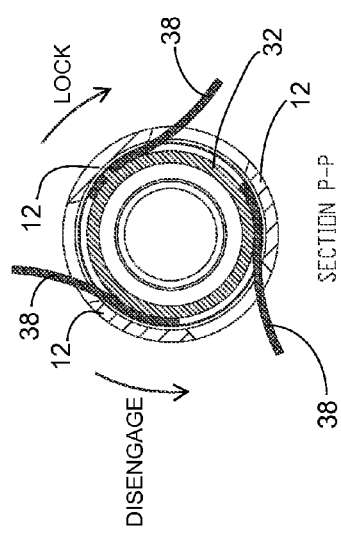
FIG. 14

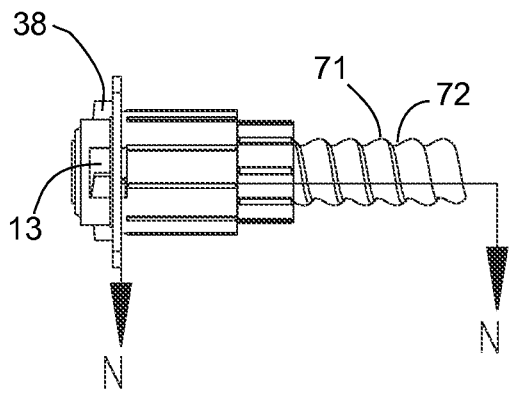
FIG. 15 A
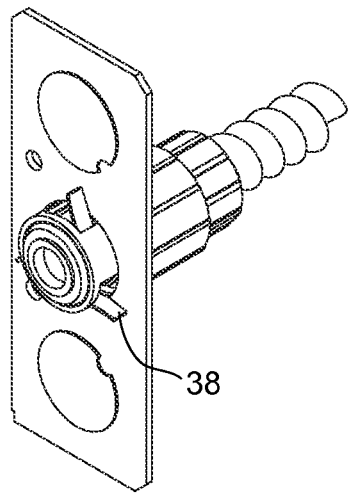
FIG. 15 C
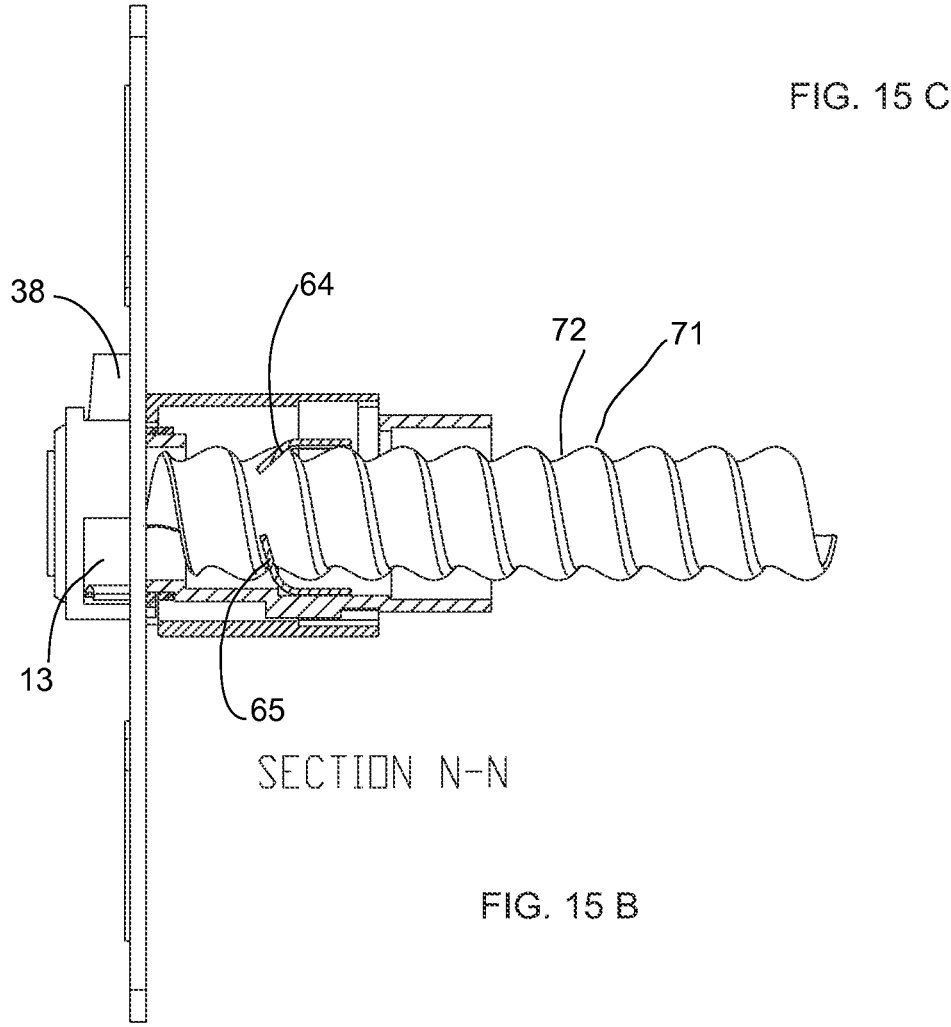
SECTION N-N
FIG. 15 B
FIG. 15

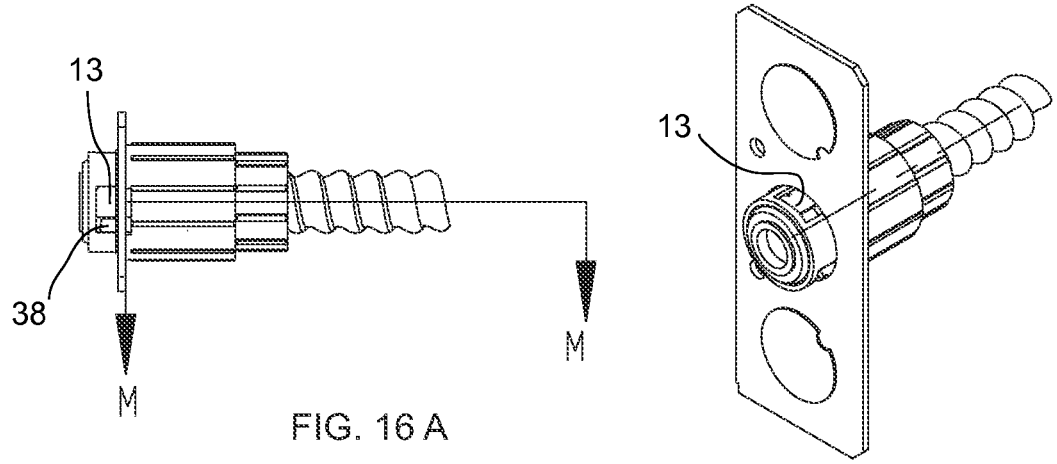
FIG. 16 A
FIG. 16 C
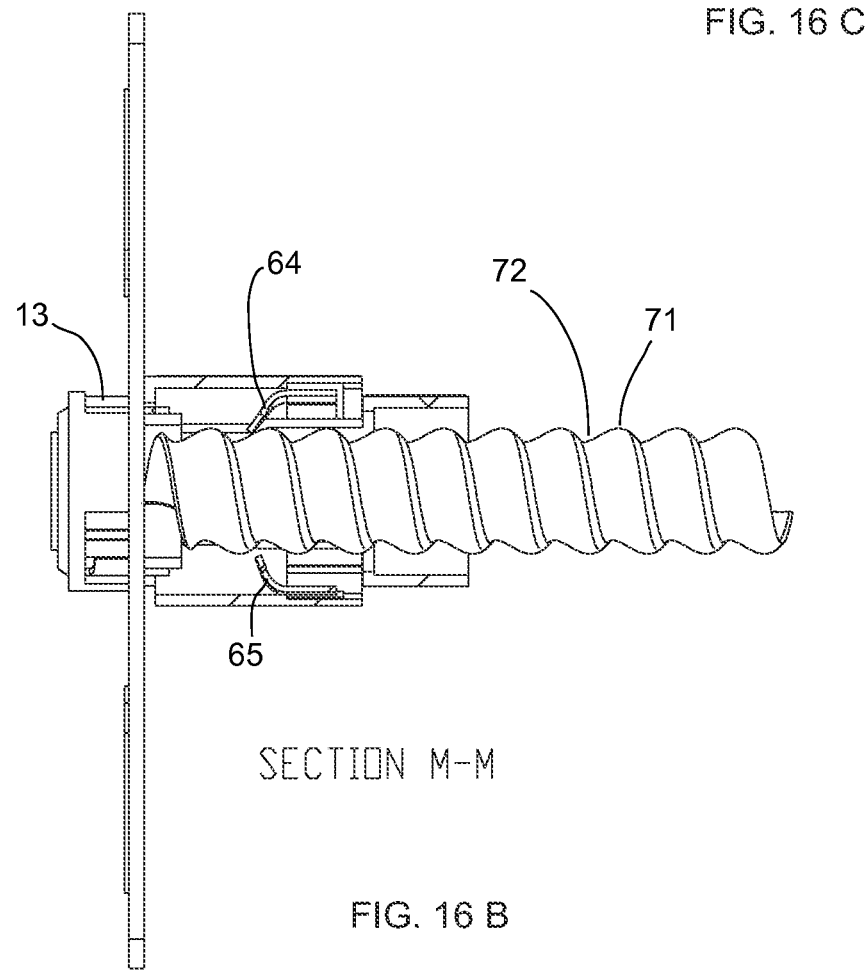
SECTION M-M
FIG. 16 B
FIG. 16

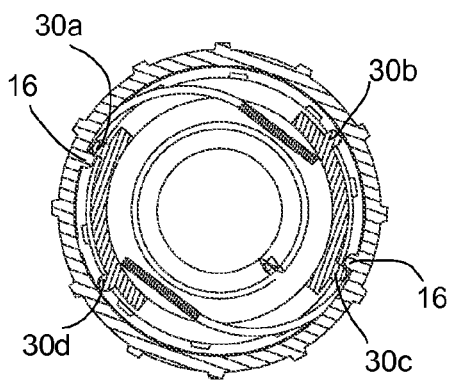
FIG. 17 A
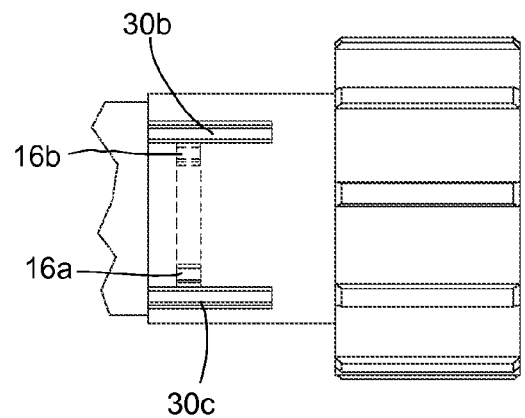
FIG. 17 B
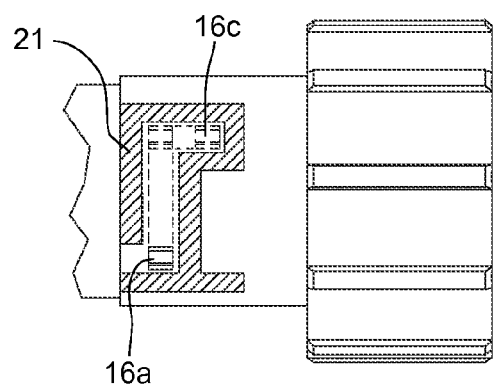
FIG. 17 C
FIG. 17

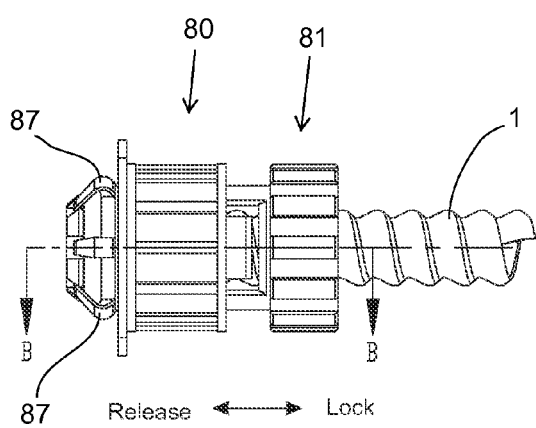
FIG. 18 A
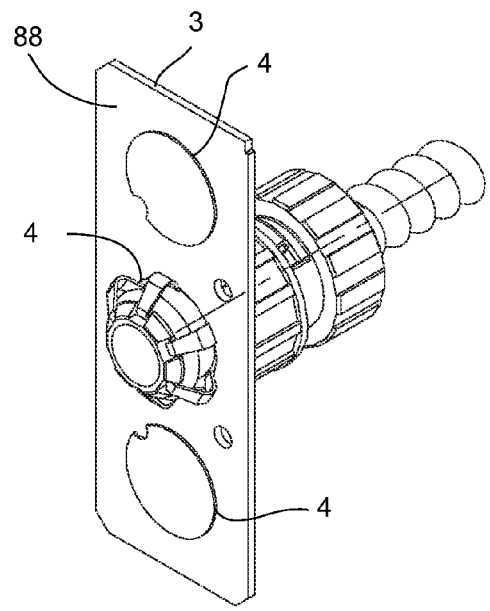
FIG. 18 C
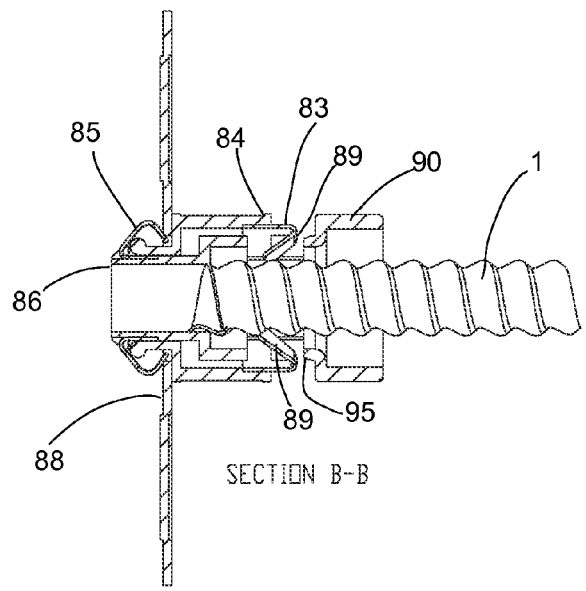
FIG. 18 B
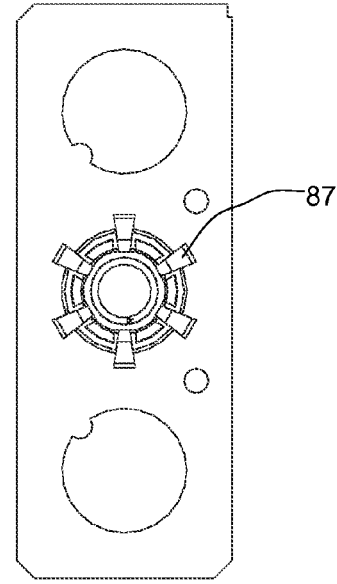
FIG. 18 D
FIG. 18

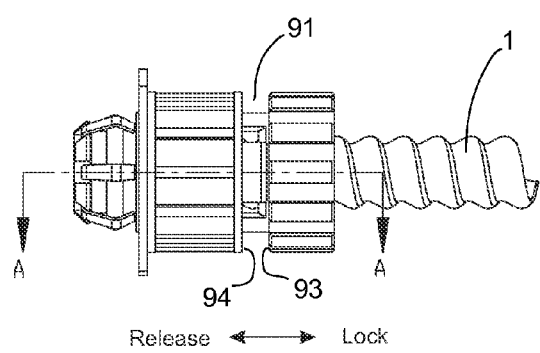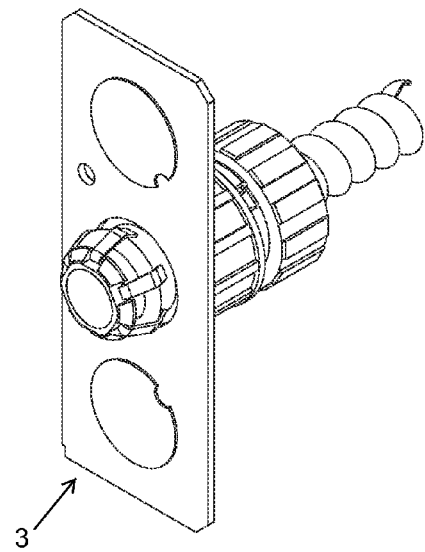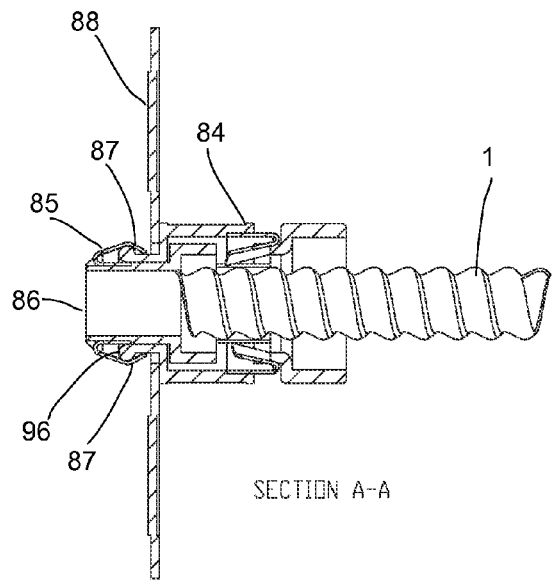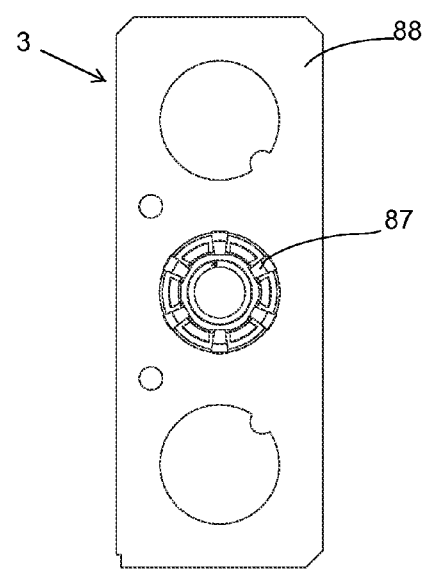
FIG. 19

SPRING LOCK ELECTRICAL FITTING

This application claims the benefit of U.S. Provisional Patent Application No. 61/367,882, filed Jul. 27,2010, the contents of which are incorporated in this disclosure by reference in their entirety.

BACKGROUND OF THE INVENTION

The present invention relates to fittings for connecting electrical cables and flexible conduit to electrical panels and junction boxes.

The intention of the invention is to make an improved fitting that allows easier insertion of the electrical cables into the trailing end of the fitting and into the electrical panel or junction box at the same time. Historically, armored cable (AC) or metal-clad cable (MC) has been connected to a panel by a tubular fitting including a leading end having a threaded nose and a trailing end having a lateral screw mounted laterally through the fitting wall. Alternatively, a set of strap and screws were attached to the trailing end. The threaded nose was inserted into an aperture in the panel and a locknut tightened thereon secured the fitting to the panel.

AC or MC cable was then inserted into the trailing end and the lateral screw or the strap screws were tightened to secure the cable to the fitting. It is important to have secure grounding and since the fitting is made out of metallic material it creates a good electrical continuity (grounding) between the electrical panel and the cable.

Typically wiring a construction project electrically, whether it is a building or factory, requires electrical contractors to make hundreds to thousands of such individual connections. Moreover, such installation necessitates using tools to achieve a secure connection, including a wrench for the lock nut and a screw driver for the laterally mounted screw. Therefore, it should be appreciated that completing all of these connections can be very time consuming, since contractors usually use such tools on each connection.

Recently, several types of snap engagement fittings have been introduced as a means of connecting cables to electrical panels and junction boxes in order to reduce the time and effort required for installation of fittings in electrical wiring. Although using such snap engagement fittings eliminates the use of tools for installation, they typically require substantial effort to snap them on the junction box or panel.

Furthermore, if there is a need for a retrofit or disconnection of the fitting, the contractors have no choice but to use tools to remove the snap engagement fittings and that, in turn, also involves substantial effort and force.

Therefore, what is needed is a fitting for securing electrical cables to the panel or junction box of a type that does not require the use of any tools for installing or removal, of either the leading or trailing end, and that allows the leading end to connect quickly and securely to the electrical junction box and the cable to be securely fitted into the trailing end. Such a fitting would vastly reduce the time and effort involved in installing or removing electrical cables in a structure's wiring. The desired fittings must be designed to work with standard electrical panels, boxes, housings, and the like, while allowing quick and easy connection through standard size knock out apertures.

The present invention offers a quick connect fitting for an electrical panel or junction box that requires no tools for connecting or removal of the fitting. Moreover, it needs much less effort and force for installation or removal compared to the existing snapping fittings. Due to its unique design, there are large contact areas between the electrical panel or junction box, the fitting, and the cable jacket that in turn result in very good electrical continuity or grounding.

SUMMARY

In one version of the invention, the fitting has an arrangement on the leading and the trailing ends for attaching the electrical cables to the junction box. The fitting comprises a pair of co-axial hollow, tubular, electrically conductive electrical connectors with two different diameters. The hollow tubular connector with smaller diameter (hereinafter the inner cylinder) fits inside the other hollow tubular connector with a bigger diameter (hereinafter the outer cylinder) allowing a rotation about an axis with respect to one another (hereinafter the connector). The connector has a fastening arrangement on the leading end for connecting to a junction box and has a fastening arrangement on the trailing end for connecting to the electrical cable.

The leading end comprises a resilient, electrically conductive strip formed in cylindrical-shaped ring (hereinafter the leading spring) that is secured and positionally fixed to the nose of the inner cylinder by means of a partial or through constraining rib on the outer diameter of the inner cylinder nose that fits in the gap between the two ends of the ring and obstructs the leading spring axial rotation.

A plurality of locking prongs (hereinafter the locking prongs) are lanced radially and bent outward in a flat, concave, or convex shape at an angle with respect to the normal cross section plane of the connector. A pair of secondary plurality of tangs (hereinafter the centric tangs) is lanced outward radially next to the locking prongs and it constrains the connector lateral movement and provides further grounding. The outer cylinder has a plurality of openings on the protruded leading end (hereinafter the collar) out of which the locking prongs and centric tangs extend.

When the outer cylinder rotates radially in a disengaging direction on the inner cylinder, the openings are displaced and the respective edges of the openings force the locking prongs and centric tangs to retract in place in a circular pattern. The disengaging direction can be clockwise or counter clockwise depending on the direction of the locking prongs cut.

When the outer cylinder is released, it rotates in a direction opposite to the disengaging direction and the openings go back to their original location allowing the locking prongs and centric tangs to extend through the openings. The locking prongs edges dig into the interior surface of the electrical panel or junction box opening when released providing a secure attachment to the electrical panel while the centric tangs constrain the lateral movement of the fitting in the electrical panel.

The trailing end comprises a resilient, electrically conductive strip formed in a cylindrical-shaped ring (hereinafter the trailing spring) that is secured and positionally fixed into the interior surface of the outer cylinder on the trailing side by means of a partial or through constraining rib inside of the outer cylinder trailing end that fits in the gap between the two ends of the ring and obstruct the spring axial rotation.

A plurality of eccentric helical strips are lanced radially towards the central axis of the connector with flat ends having longitudinal protrusions that are bent inwardly to a smaller diameter than the outer diameter of the electrical cable in conjunction with which the fitting is used (hereinafter the trailing prongs). The leading ends of the trailing prongs are ragged to enable each prong to engage a trough in the armor surface of the electrical cable and thereby hold it fast to the trailing end of connector.

The tight engagement of the trailing prongs to the trough areas of the cable provides good surface contact between the trailing tangs and the cable, thus improving electrical continuity and grounding between the cable, the fitting, and the panel or junction box.

The inner cylinder has a plurality of openings matching the number of trailing prongs through which the trailing prongs pass to engage with the electrical cable. When the connector rotates to disengaging position, the longitudinal edges of the openings lift up the eccentric strips and consequently lift the trailing prongs to disengage them from the electrical cable while the leading end of the connector pushes the front spring prongs inside the collar. The described mechanism enables attaching the electrical cable to the fitting and inserting the fitting into the knock out hole on the electrical box at the same time.

Since the leading spring and the trailing spring are both in deflected state, after positioning the fitting into the knock out hole and the cable into the fitting, the entire assembly will lock automatically in place by releasing the fitting. Likewise if it is necessary to disconnect the cable from the electrical box, the contractor will rotate the connector to a disengaging position and the whole fixture unlocks, permitting removal of either the cable or the fitting or both. One or multiple sets of stops in the form of ribs or pins and channels can be incorporated into the fitting to guide and restrict the angular displacement range. In alternative embodiments of the invention, the leading and trailing springs may be comprised of two or more spring segments which are assembled to form a ring.

Therefore a secure and tool free method of installation or removal is made possible with minimal of effort and force applied, while maintaining a very good grounding on both ends of the connector.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 Including FIGS. 3A-3D, shows an outer cylinder of the fitting in a side view, an end view a sectional view taken along line D-D in FIG. 3A in the direction of the appended arrows and a perspective view;

FIG. 4 including FIGS. 4A-4D shows an inner cylinder of the fitting in a side view, an end view a sectional view taken along line C-C of FIG. 3B, in the direction of the appended arrows, and a perspective view.

FIG. 5 is a top view of a blank that can form the leading spring of the fitting.

FIG. 6 including FIGS. 6A-6C shows the leading spring of FIG. 5 in its natural state in an end view, a side view and a perspective view.

FIG. 7 including FIGS. 7A, 7B shows a spring lock electrical fitting of the present invention in locked configuration in an end view and a perspective view.

FIG. 8 shows a blank that forms the trailing spring of the fitting.

FIG. 9, including FIGS. 9A-9D show the trailing spring of FIG. 8 in a side view, an end view, a top view and a perspective view, respectively.

FIG. 10 including FIGS. 10A, 10B shows a loaded leading spring in a top view and a perspective view.

FIG. 11 including FIGS. 11A-11D shows a trailing spring in its natural state in a side view, an end view, a top view and a perspective view.

FIG. 12 including FIGS. 12A-12D, shows a trailing spring in its natural state in locking position engaged with an electrical cable in a side view, an end view, a top view and a perspective view.

FIG. 13 including FIGS. 13A-13D, shows a loaded trailing spring in its deflected state disengaged from an electrical cable in a side view, an end view, a top view and a perspective view.

FIG. 14 including FIGS. 14A-14D, shows a side view and three sectional views of a fitting attached to an electrical panel with the two springs, the sectional views being taken along lines p-p, r-r and u-u of FIG. 14A in the direction of the appended arrows.

FIG. 15 including FIGS. 15A-15C, shows a spring lock electrical fitting in locked position attached to an electrical panel in a side view, in a section view taken along line N-N of FIG. 15B in the direction of the appended arrows and in a perspective view.

FIG. 16 including FIGS. 16A-16C, shows a spring lock electrical fitting in compressed position attached to an electrical panel in a side view, a sectional view taken along line M-M of FIG. 16A in the direction of the appended arrows and in a perspective view.

FIG. 17 including FIGS. 17A-17C, shows the cross section view U-U of FIG. 14B with two broken top views of FIG. 4A depicting two alternatives of the stopper mechanisms.

FIG. 18 including FIGS. 18A-18D, shows an alternative design of the spring lock electrical fitting in locked position in a side view and attached to an electrical panel in a sectional view taken along the line B-B of FIG. 18A in the direction of the appended arrows, a perspective view and an end view.

FIG. 19 including FIGS. 19A-19D, shows the alternative design of FIG. 18 in the released or disengaged position in a side view and attached to an electrical panel in a sectional view taken along line A-A of FIG. 19A in the direction of the appended arrows, a perspective view and an end view.

DETAILED DESCRIPTION OF THE INVENTION

Figure 1:
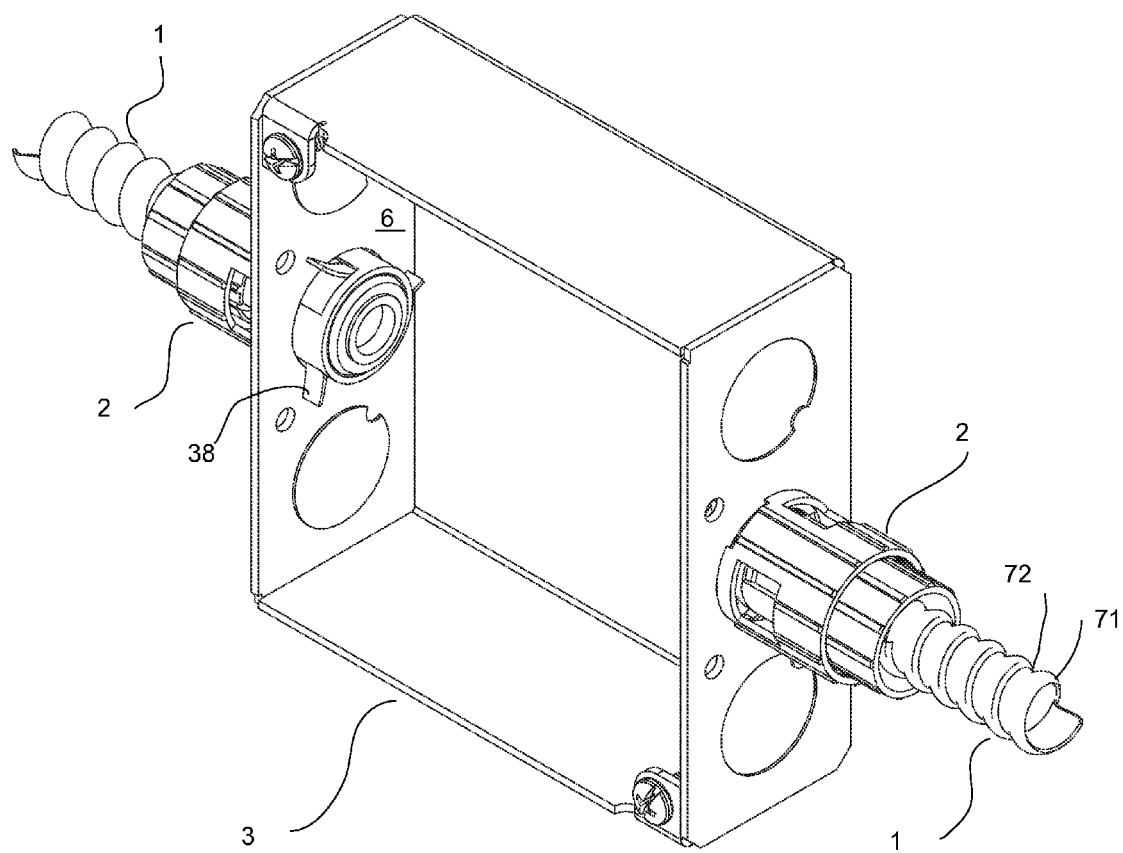
FIG. 1 shows a perpective view of a preferred embodiment of two spring lock electrical fittings according to the present invention attached to an electrical junction box.
Figure 2:
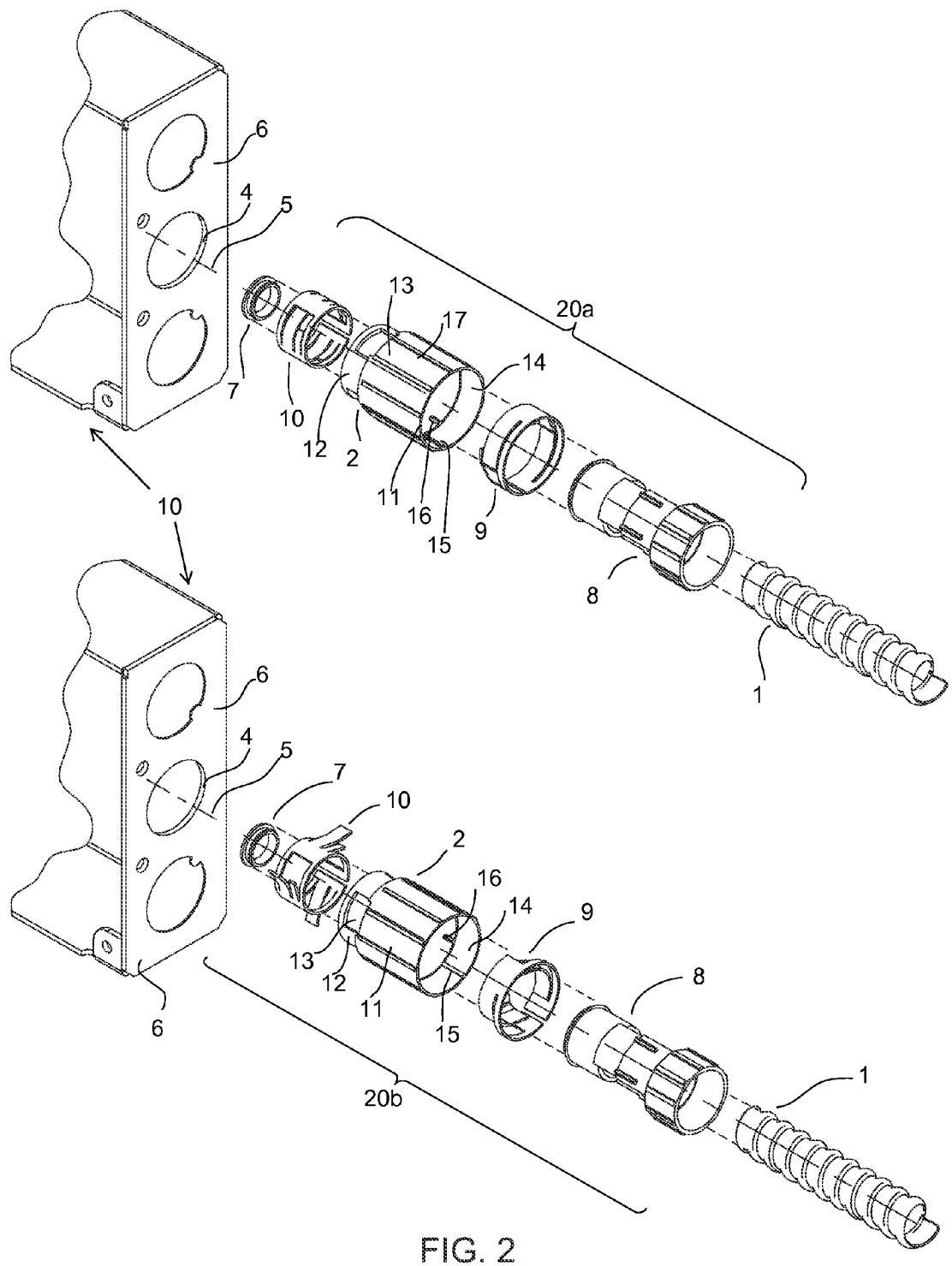
FIG. 2 shows a perspective view of the spring lock electrical fittings of FIG. 1 in alignment with an electrical junction box with the exploded fitting in disengaged and locked orientations.

Turning first to FIGS. 1 and 2, the present invention provides an electrical fitting 2 that secures a flexible electrical cable conduit 1 to an electrical panel or junction box 3 through the knock out hole 4 shown in FIG. 1 and FIG. 2. In the present configuration, fitting 2 connects a flexible electrical conduit 1 which supports a plurality of electrical wires (not shown) to the electrical junction box 3 enabling a secure connection while it establishes a conductive path. Furthermore the fitting of the present invention enables spring lock engagement of the fitting 2 to the electrical junction box 3 on its leading end and spring lock engagement of the flexible electrical cable 1 to the fitting 2 on the trailing end of it. The flexible electrical cable conduit 1 generally consists of an outer metal sheath that has been formed from a strip of metal that has been helically wound and interlocked to produce a contour forming crowns 71 and troughs 72. (depicted in FIG. 14.)

FIG. 2 shows two exploded views of a version of the present invention where each set of fittings 2 is aligned with an electrical junction box 3 and a flexible electrical cable 1. The top figure is an exploded view of the fitting 2 that shows the fitting assembly 20a in loaded state ready for insertion into the knock out hole 4 of the electrical junction box 3 along the axis 5. The bottom figure is an exploded view of the fitting 2 shows the fitting assembly 20b in the natural spring state of the components (hereinafter locked state). As shown in FIG. 2 the fitting assembly consists of a plastic insulator 7, a leading spring ring 10, an outer tubular electrically conductive cylinder 200 that slides about the axis over an inner tubular electrically conductive cylinder 8, and a trailing spring ring 9.

As is generally shown in FIGS. 2 and 3, the tubular electrically conductive cylinder 200 is comprised of a tubular housing 11 with a smaller diameter collar 12 on the leading end that has a plurality of openings 13 which covers over leading spring ring 10, a recessed area 14 where it accommodates the trailing spring ring 9, a partial or through embossed rib 15 on the inner wall of the recessed area 14 that restrains rotary movement of the trailing spring ring 9 with respect to the housing 11, and a plurality of ribs 16 (hereinafter outer stoppers) on the inner wall of the housing 11 to restrain axial rotation of the trailing spring ring 9.

In the present illustration, one pair of outer stoppers is shown. Further it has a plurality of longitudinal strip bosses 17 around the peripheral of the tubular housing 11 for better grip. Additionally there is plurality of through openings 21 on the tubular housing 11 for the installers to visually check the location of the electrical cable (not shown) inside the fitting 2.

FIG. 4 shows the next component of the fitting 2 which is an inner tubular electrically conductive cylinder 8 that has a secondary gripping area 26 with a plurality of gripping ribs 27 close to the trailing end 25. The gripping area 26 further steps down to a cylindrical middle area 28 where it has a plurality of openings 29 and a plurality of ribs 30a, 30b 30c, and 30d (hereinafter inner stoppers) on the outer diameter that set the axial rotational range of the fitting assembly in cooperation with outer stoppers 16. The middle area 28 further steps down in diameter to form the leading nose 31 of the inner cylinder where it defines the seat 32 for leading spring 10 (not shown) between the stepped down nose section 36 and the tip flange 33. A partial or through embossed rib 34 runs longitudinally between step 36 and flange 33 to restrain rotary movement of the leading spring ring 10 with respect to the inner cylinder 8. On the leading end, 24, the cylinder is necked down to receive the plastic insulator 7 in the circular opening 35.

FIG. 5 shows the leading spring ring 10 that is typically made of resilient material like spring steel alloys. Referring to FIG. 5, the leading spring ring 10 is formed out of a blank strip 48 that is formed to a circular shape making the cylindrical base 49 that further contains a plurality of tangs 37 and prongs 38 cut out from it. The tangs 37 and prongs 38 are bent outward, away from the ring axis 5. They can be lanced in to concave, convex, or flat shapes. The two ends 45a, 45b of the strip blank 48 form the gap 85 (seen in FIGS. 6A, 6C) when rolled into a circular ring.

Referring to FIG. 6, each prong 38 is bent in a convex form making a curled up, cantilever spring prong 38 with a parallelogram section having one end 39 integral with cylindrical base 49 and other free end 40. The parallelogram cantilevered prongs lean towards the trailing edge 44 of the leading spring ring 10 enabling the tip of the prong edge 40 to dig in to the inner wall of the panel plate 6 of the electrical box 3 (see FIG. 1). Each tang 37 is bent outward, making a cantilever spring with a rectangular section and one end 46 that is integral with the cylindrical base 49 adjacent to the prong end 39 with other end 47 free. Each flat tang 37 is paired with a curled up prong 38. In locking position, the free end 47 of each tang 37 is in contact with the inside bore of the hole 4 on plate 6 (as seen in FIG. 1).

The leading spring ring 10 has a smaller diameter than the 32 of the inner cylinder 8. Therefore, when it seats on the seat 32, the ring is completely fixed in place. The spring longitudinal movements are restrained by the step 36 and the flange 33 while its axial rotation is constrained by the rib 34. The collar 12 of outer cylinder 200 slides over the seat 32 of the inner cylinder 8, sandwiching the leading spring ring 10 in between. The openings 13 on the collar 12 that match in number of sets of prongs 38 and tangs 37 on the leading spring ring 10 govern the state of the leading spring ring 10 to the disengaged or locking state by rotating either the inner cylinder 8 or the outer 200 cylinder about the axis 5.

When the fitting 2 is in locking position, the prongs 38 dig in to the inner wall of the electrical junction box and constrain the fitting 2 from axial movements along axis 5. At the same time, the tangs 37 push against the knock out hole 4 inner bore constraining radial movements. Hence, the fitting locks in place tightly while providing a secure electrical continuity through prongs 38 and tangs 37.

FIG. 7 shows the axial rotational directions of the fitting in order to lock it or disengage it. When the fitting is in locking state, the openings 13 are over the prongs 38 and tangs 37 allowing them to stick out through the openings 13. To disengage, the outer cylinder rotates about the axis in disengage direction with respect to the inner cylinder shown in FIG. 7.

As the cylinders rotate, the longitudinal edges 20 of the openings 13 (FIG. 3B) which are adjacent to the integral ends 39 and 46 (FIG. 6) of the respective prongs 38 and tangs 37 roll over the prongs 38 and tangs 37 forcing them downward radially towards axis 5. The prongs 38 and tangs 37 disengage from the hole 4 inner bore to a diameter smaller than the knock out hole 4 and the collar 12 allowing the fitting to be easily removed.

Referring to FIGS. 8-13, the trailing spring ring 9 is formed out of a blank strip 61 into a circular shape making a cylinder consisting of two half cylinders 70a and 70b. The two half cylinders form a disjointed ring on the trailing side 68 of the spring that sits into the circular recessed section 14 of the outer cylinder 200 with a typically larger diameter than the circular recessed section 14 ensuring a fixed position inside the bore of the outer cylinder. The axial movement of the ring is constrained by the recessed section 14 and the radial rotation is constrained by the rib 15 of the cylinder 200.

Further, two helix extensions 55 and 56 wind inward towards axis 5 connecting the two flat plates 52 and 53 to the cylinder. The extensions are integral with the spring ring cylinder from the ends 62 and 63 sequentially and spiraling inwardly towards the axis 5 and ending in flattened ends at a certain angle (typically between 10 to 60 degrees) with respect to the tangent plane at intersection of the flat plate 52 with curve 55 and the flat plate 53 with curve 56. A protruded tab 57 is angled down at bent line 54a toward axis 5 from flat plate 52 and subsequently a shorter tab 58 is bent down at line 54b staggered with the former tab towards axis 5 to form a circle with smaller diameter around axis 5.

Further a circular opening with a smaller diameter than the diameter of the flexible electrical cable 1 is formed by means of two curvature cuts 59 and 60 through the free ends of angled tabs 57 and 58 subsequently to create the special formed tongues 64a and 64b of the tab 57 and tongues 65a and 65b on the free end of the tab 58. The free ends of tongue 64b and 65b are bent down even further along the two bent lines 50 and 51 to follow the helix shape of the flexible electrical cable armor.

The configuration of the mentioned tongues 64, 65, combined with the sum of angled features and staggered positions of the tabs enables the resilient tips of the tabs 57 and 58 to adapt to the contour boundary of the helix armor of a typical flexible electrical cable. The two ends 66a and 66b of the strip blank 61 form the gap 69 when rolled in to a circular ring.

FIG. 9 shows the trailing spring ring 9 that is typically made of resilient material like spring steel alloys.

FIG. 10 shows the leading spring ring 10 loaded in a deflected form when the fitting is in disengaged state.

FIG. 11 shows the trailing spring ring 9 in its circular shape where the gap 69 can be plainly seen.

FIGS. 12 and 13, respectively, show the metal cable in the engaged and released states. FIG. 12 shows only the trailing spring locking on the flexible electrical cable. FIG. 13 shows the released state with the cable unrestrained.

FIGS. 14 and 15 show the fitting 2 in locked position out of and in a junction box 3, respectively. When the fitting 2 is in locked position, the leading spring tangs 37 engage the walls of the aperture. The trailing spring ring is in free form state and is fully engaged on the outer surface of the flexible electrical cable armor and the tip of the tabs 57 and 58 fall in to the trough 72 of flexible electrical cable 1 (not shown). If a force beyond the spring resistance force is applied to pull the flexible electrical cable out, the reciprocal planes 52 and 53 stop the outward movement of the spring prongs when they come in contact with the inner wall sections 73a and 73b and as a result, securing the connection tightly.

FIG. 15 and FIG. 16 show the fitting 2 in disengaged position. FIG. 16B shows that the trailing spring is deflected and pushed outward releasing the flexible electrical cable 1. To connect or disconnect the fitting, the outer cylinder rotates about the axis in disengage direction with respect to the inner cylinder shown in FIG. 14.

As the cylinders rotate, the longitudinal edges 22a and 22b of the two openings 29 and further the two stoppers 30a and 30c act as radial levers and lift up the spiral arms 55 and 56 of the trailing spring ring 9 and as a result, lifting the plates 52 and 53. Therefore the locking prongs 38 that are attached to the said plates will lift up releasing the flexible electrical cable while the outer cylinder collar deflects the leading spring inside it.

At this point the fitting 2 is in disengaging state for installation, the flexible electrical cable 1 is inserted into the fitting 2 and the fitting 2 goes through the knock out hole 4 of the electrical panel 6. If the fitting 2 is already installed and the contractor intends to remove it, the trailing spring ring 9 is in deflected state releasing the flexible electrical cable 1 and accordingly the leading spring ring 10 unlocks the fitting from the electrical panel 6 as described allowing removal of either the cable 1 or the fitting 2 or both.

FIG. 17 shows the stoppers that define the rotational range of the fitting and an alternative guiding channel to the described mechanism. The broken view on top right (FIG. 17B) shows the locations 16a and 16b of outer stopper 16 (of the outer cylinder) when it rests against inner stopper ribs 30c and 30b respectively.

The second broken view on the right (FIG. 17C) shows the alternative guiding channel with outer stopper 16 locations at 16a (locked position) and 16c (disengaged position) where the outer stopper 16 can be locked in the recessed niche to hold the springs deflected and the fitting in disengaged position.

FIGS. 18 A, B, C, and D show an alternative design of the present invention at an engaged position. The fitting 2 comprises two cylinders and two springs. The outer cylinder 80 slides over the inner one 81 with a trailing spring 83 fit to the trailing end 84 of the outer cylinder 80. The trailing spring 83 secures the armored cable 1 in the fitting. At the same time, the leading spring 110 that is attached to the tip (nose) 86 of the inner cylinder 81 is compressed by the tailing spring force exerted on the inner cylinder pushing it back in lock direction and consequently tightening the leading spring star prongs 87 against the inner wall 88 of the junction box 3. The trailing spring 83 is stronger than the leading spring 110 and has a plurality of prongs 89 that secures the armored cable 1 while holding the mechanism in locked position.

FIGS. 19 A, B, C, and D show the assembly in released position. To insert or release the fitting into or out of the knock out hole 4, the trailing end 90 of the inner cylinder 81 that has a bigger diameter is pushed along the release direction filling the gap 91 between the stepped down portion 93 of the inner cylinder 81 and the trailing end 94 of the outer cylinder 80.

As the inner cylinder 81 is pushed towards the junction box 3, its slanted edge 95 lifts up the trailing spring prongs 89 and retracts them while providing a space 96 for the leading spring 110 to collapse back to its natural relaxed position (FIG. 19B). While holding the two cylinders close to one another, the whole assembly can be inserted in or taken out of the knock out hole 4. As soon as the hold is released, the trailing spring force prevails and pushes the mechanism in to the lock position.

Use of the present invention saves a lot of time over traditional fittings and has more advantages over the current snapping fittings such as elimination of the need for manual use of tools to connect or disconnect as well as less effort to do it.

Armored electrical cables are supplied in different nominal sizes in accordance with the National Electrical Code. The spring lock electrical fitting of the present invention can therefore be produced in matching sizes to accommodate the various nominal sizes with the same concept and mechanism scaled to the pertinent sizes.

What is claimed is:

1. Apparatus for securing electrical wiring to a receptacle having an apertured wall through which the wiring passes, the combination comprising:
   a. collar means having a hollow interior through which wiring can pass and sized to be slightly smaller than the wall aperture;
   b. an extendable interference member mounted in a leading end of said collar means; and
   c. engagement means including an engagement member in a trailing portion of said collar means for releasably engaging electrical wiring in said collar means interior; whereby said collar means concurrently extend and retract said interference member and said engagement member such that said interference member, when extended, prevents withdrawal of said collar means from the aperture and said engagement member prevents lateral motion of the electrical wiring.

2. Apparatus as in claim 1 wherein said collar means include a stop member for limiting travel through the aperture.

3. The apparatus of claim 1, wherein said collar means include include a first apertured sleeve, said interference member extending through said sleeve aperture so that rotation of said sleeve in one direction captures said interference member beneath said sleeve and rotation in the opposite direction releases said interference member into obstructing orientation.

4. The apparatus of claim 1 wherein said collar means include capture means for deploying said engaging member so that rotation of said capture means in one direction captures said engaging member and rotation in the opposite direction releases said engaging member into engagement with the electrical wiring.

5. The apparatus of claim 1 wherein said collar means are manually rotatable to extend and withdraw said interference member and said engagement member.

6. The apparatus of claim 1 wherein said collar member is manually movable laterally to extend and retract said interference member and said engagement member.

7. The apparatus of claim 6 wherein said interference member is foldable such that when folded, said member extends outwardly into an interfering orientation, said collar means having reciprocating axial motion unfold said interference member to no longer extend outwardly and to fold said interference member to outwardly extend.

8. The apparatus of claim 1 wherein said interference member has major and minor components, said minor components engaging the wall aperture.

9. The apparatus of claim 1 wherein said engagement member has major and minor components.

10. Apparatus for securing electrical wiring to an apertured wall through which the wiring passes, the combination comprising:
   a. a collar member having a hollow interior through which wiring can pass and sized to be slightly smaller than the wall aperture;
   b. extendable interference members mounted in a leading end of said collar member; and
   c. engagement means in a trailing portion of said collar means including engagement members for releasably engaging electrical wiring in said collar means interior; whereby said collar means concurrently extends and retracts said interference members and said engagement means such that said interference members, when extended, prevent withdrawal of said collar means from the wall aperture and said engagement means prevent lateral motion of the collar member and the electrical wiring.

11. Apparatus as in claim 10 wherein said collar means include a stop member for limiting travel through the wall aperture.

12. The apparatus of claim 10, wherein said collar means include an apertured sleeve, said interference members extending through said sleeve apertures so that rotation of said sleeve in one direction captures said interference members beneath said sleeve and rotation in the opposite direction releases said interference members into obstructing orientation.

13. The apparatus of claim 10 wherein said collar means include securing means, said engagement means include engaging members extending into said collar interior so that rotation of said securing means in one direction captures said engaging members on said securing means and rotation in the opposite direction releases said engaging members into engagement with the electrical wiring.

14. The apparatus of claim 10 wherein said collar means include a manually rotatable member coupled to rotate said first aperture sleeve and said securing means.

15. The apparatus of claim 10 wherein said interference members when folded, extend outwardly, said leading end having reciprocating axial motion to unfold said interference members to no longer extend outwardly and to fold said interference members to outwardly extend.

16. Apparatus for securing electrical wiring to an apertured wall through which the wiring passes, the combination comprising:
   a. an apertured leading collar member;
   b. leading spring means within said leading collar member, said spring means having extendable leading prongs aligned to protrude through said leading collar member apertures;
   c. a trailing collar member adjacent to and coaxial with said leading collar member; and
   d. trailing spring means exterior to said trailing collar member, said trailing spring means having extendable trailing prongs, aligned with capture means in said trailing collar member, to protrude into an interior of said trailing collar member whereby said leading prongs are adapted to prevent lateral movement through the wall aperture and said trailing prongs are adapted to engage electrical wiring passing through said collars and through the wall.

17. The apparatus of claim 16 wherein said leading prongs have major and minor components, said minor components being adapted to engage the wall aperture.

18. The apparatus of claim 16 wherein rotation of said leading collar in a first direction extends said leading prongs and rotation in the opposite direction retracts said leading prongs.

19. The apparatus of claim 16 wherein lateral movement of said leading collar in a first direction extends said leading prongs and lateral movement in a direction opposite to said first direction retracts said leading prongs.

20. Apparatus for securing electrical wiring to an apertured wall through which the wiring passes, the apparatus comprising:
   a) an apertured collar having an axis; and
   b) a leading spring within the collar, the spring having an extendable leading prong aligned to protrude through the collar apertures, the prong having a retracted position for insertion through the wall and an extended locking position to prevent axial movement of the apparatus from the wall, and
   wherein a radially inward force on the leading spring moves the prong to the retracted disengagement position from the extended position.

21. The apparatus of claim 20 comprising a trailing spring adapted to engage electrical wiring passing through the collar and through the wall.

22. The apparatus of claim 20 wherein the leading spring is biased for the prong to be in the extended locking position.

23. The apparatus of claim 20 wherein the collar is adapted to move to provide the radially inward force.

24. The apparatus of claim 20 comprising more than one prong.

25. A method for reversibly securing electrical wiring to an apertured wall comprising the steps of:
   a) securing the apparatus of claim 20 in place by providing a force on the leading spring to move the prong to the retracted disengagement position, causing the prong to extend through the aperture, and then releasing the force so the prong moves to its extended locking position; and
   b) extending electrical wire through the apparatus and the wall.

26. A method for securing and then releasing electrical wiring to an apertured wall comprising the steps of:
   a) securing the apparatus of claim 20 in place by providing a force on the leading spring to move the prong to the retracted disengagement position, causing the prong to extend through the aperture, and then releasing the force so the prong moves to its extended locking position;

b) extending electrical wire through the apparatus and the wall; and c) forcing the prong to its retracted disengagement position and withdrawing the apparatus from the wall.

* * * * *